US005611074A

United States Patent [19]
Kantz et al.

[11] Patent Number: 5,611,074
[45] Date of Patent: Mar. 11, 1997

[54] EFFICIENT POLLING TECHNIQUE USING CACHE COHERENT PROTOCOL

[75] Inventors: Joseph C. Kantz, Beaver, Pa.; Abraham Mammen, Poughkeepsie, N.Y.; Susan D. Wright, Durham, N.C.

[73] Assignee: International Business Machines Corporation, Armonk, N.Y.

[21] Appl. No.: 355,879

[22] Filed: Dec. 14, 1994

[51] Int. Cl.⁶ ........................................ G06F 13/16
[52] U.S. Cl. .................... 395/473; 395/866; 395/727; 395/483
[58] Field of Search ...................... 395/445, 483, 395/487, 727, 289, 866, 867, 473

[56] References Cited

U.S. PATENT DOCUMENTS

| | | | |
|---|---|---|---|
| 4,683,531 | 7/1987 | Kelch et al. | 395/289 |
| 4,965,718 | 10/1990 | George et al. | 395/478 |
| 5,050,072 | 9/1991 | Earnshaw et al. | 395/288 |
| 5,119,292 | 6/1992 | Baker et al. | 395/293 |
| 5,129,064 | 7/1992 | Fogg, Jr. et al. | 395/500 |
| 5,179,702 | 1/1993 | Spix et al. | 395/650 |
| 5,191,649 | 3/1993 | Cadambi et al. | 395/200.05 |
| 5,253,353 | 10/1993 | Mogul | 395/449 |
| 5,261,106 | 11/1993 | Lentz et al. | 395/726 |
| 5,261,109 | 11/1993 | Cadambi et al. | 395/291 |
| 5,282,272 | 1/1994 | Guy et al. | 395/200.06 |

OTHER PUBLICATIONS

Handy, "The Cache Memory Book", 1993, pp. 158–161.
Hennessy et al., "Computer Architecture A Quantitative Approach", 1990, pp. 471–473.

*Primary Examiner*—Eddie P. Chan
*Assistant Examiner*—Kevin L. Ellis
*Attorney, Agent, or Firm*—Whitham, Curtis, Whitham & McGinn; Volel Emile

[57] ABSTRACT

An efficient polling technique to attain improved system performance preserves the concept of polling, but instead of polling across system buses to the device, a poll is made within the processor's cache structure, which is typically internal to the processor complex or attached on a local isolated bus. The polling status location is mapped in the cachable address space of the processor. Hence, the polling occurs to a normal cachable location. When the device completes its task, it signals to the polling loop by invalidating the cache line corresponding to the poll location. The next time software tries to read the status value, the processor misses in its cache and automatically reloads the updated status value from the device. This causes the polling loop to exit and normal processing continues. The only bus traffic that results is that which is issued by the device to signal cache line invalidation and a subsequent processor initiated cache line reload. Hence, the bus is totally available for all agents while the processor is within the polling loop.

5 Claims, 5 Drawing Sheets

SOFTWARE     CACHE     DEVICE

EFFICIENT POLLING TECHNIQUE USING CACHE COHERENT PROTOCOL

BACKGROUND OF THE INVENTION

1. Field of the Invention

The present invention generally relates to polling techniques used in data processing systems and, more particularly, to polling techniques that work in conjunction with existing cache coherent protocols to significantly improve overall system performance.

2. Description of the Prior Art

In environments where there is a level of parallelism between software and a hardware device, for proper flow of control there is a need for synchronization. A typical scenario is one where software passes a packet of data to a device and wants to know if the device has completed acting on the data. Usually the device exposes an abstraction of a status register for software to query state. A series of repeated queries is referred to as a polling loop. When the device finally completes the previously dispatched task, the reflected state in the status register is read by software, which causes it to exit the loop and proceed with its normal processing. While polling loops do not perform any useful work, they are sometimes unavoidable.

The biggest problem with this approach is that a substantial portion of the system resources are tied up while software stays in the polling loop. Usually, devices are quite far from the processor complex, attached to some input/output (I/O) bus. In order to query status, the processor executes a series of load, compare, branch instructions. The load instruction sees the latency of the system buses and the device itself. A tight polling loop generates these load instructions at a very rapid pace, which in turn saturates the available system bus bandwidth. This implies that another critical activity on the machine that is dependent on the system bus is insufficiently serviced. In many situations, the device itself may be relying on use of the system bus in order to complete its task. Hence, the act of polling across the bus actually comes in the way of device response.

SUMMARY OF THE INVENTION

It is therefore an object of the present invention to provide an efficient polling technique to attain improved system performance.

According to the present invention, there is provided a scheme to preserve the concept of polling, but instead of polling across system buses to the device, a poll is made within the processor's cache structure, which is typically internal to the processor complex or attached on a local isolated bus. The polling status location is mapped in the cachable address space of the processor. Hence, the polling occurs to a normal cachable location. When the device completes its task, it signals to the polling loop by invalidating the cache line corresponding to the poll location. The next time software tries to read the status value, the processor misses in its cache and automatically reloads the updated status value from the device. This causes the polling loop to exit and normal processing continues. The only bus traffic that results is that which is issued by the device to signal cache line invalidation and a subsequent processor initiated cache line reload. Hence, the bus is totally available for all agents while the processor is within the polling loop.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
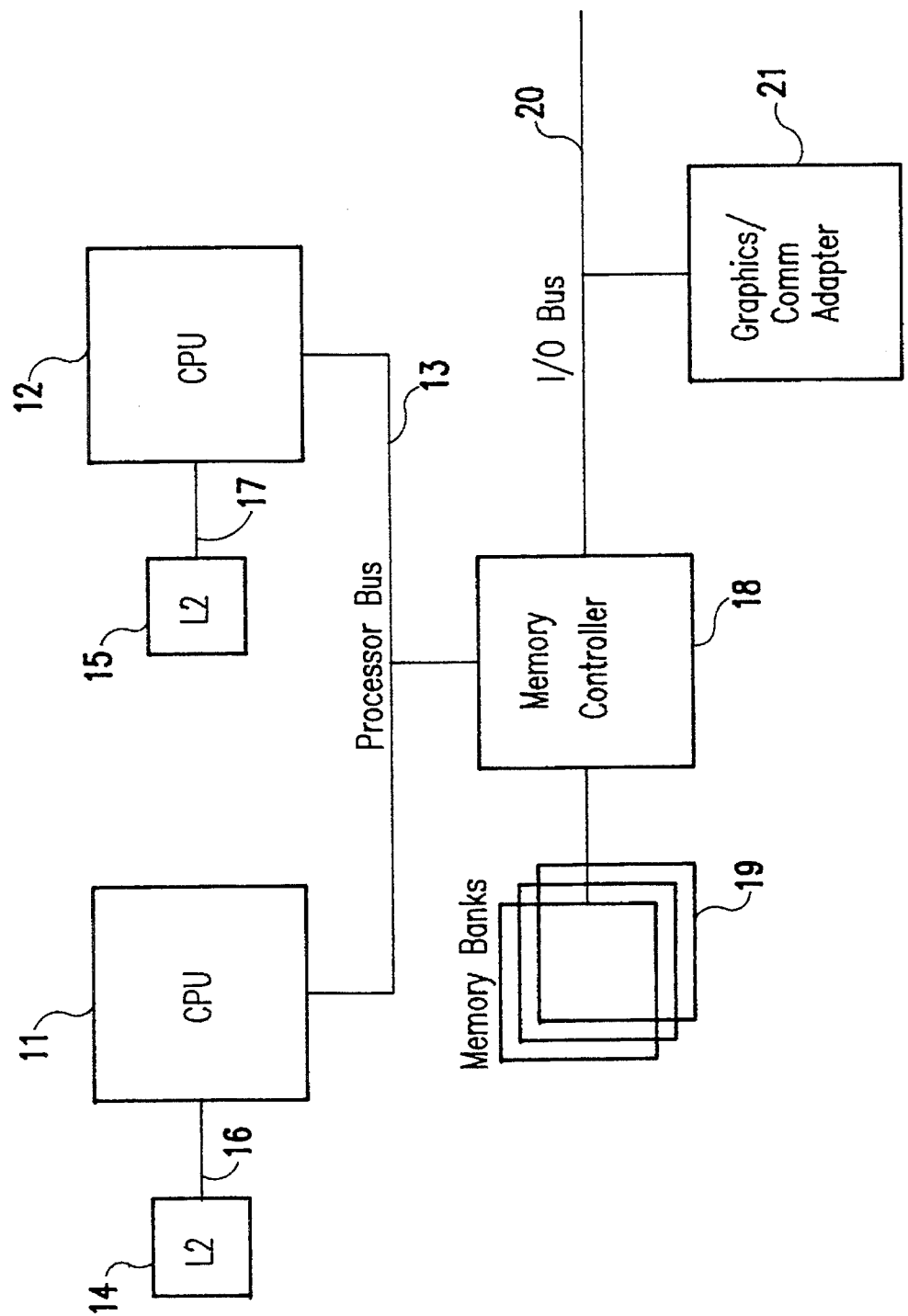
FIG. 1 is a high level block diagram showing a computer system of the type on which the invention may be implemented.

Referring now to the drawings, and more particularly to FIG. 1, there is shown a block diagram of a hardware system on which the invention may be implemented. This system is a multiprocessor system including central processing units (CPUs) 11 and 12 connected to a common processor bus 13. Each of these CPUs have one or more levels of cache. Here, level two (L2) caches 14 and 15 are shown connected by local buses 16 and 17 to CPUs 11 and 12, respectively, and for the sake of generality it will be assumed that these CPUs each have a level one (L1) cache (not shown) which may be part of the CPU structure itself. The processor bus 13 is connected to a memory controller 18 which provides access to multiple banks of random access memory (RAM) 19 for both the CPUs 11 and 12 and an input/output (I/O) bus 20. Various adaptors are connected to the I/O bus 20 including, for example, a graphics and communications adapter 21. It will be understood by those skilled in the art that the I/O bus 20 will typically have a hard disk controller adapter and possibly a floppy disk controller as well as a keyboard adapter connected to it, but for the sake of simplicity, only so much of the hardware is shown as necessary to understand the operation of the invention.

Figure 2:
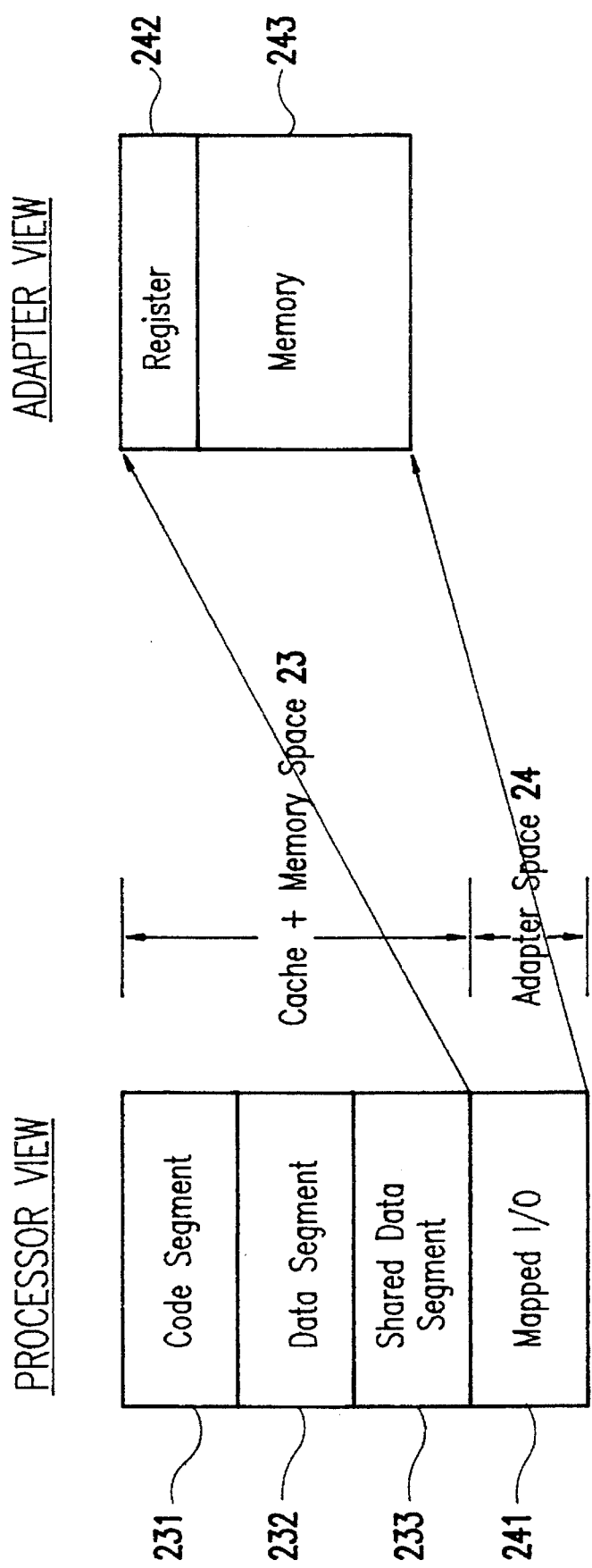
FIG. 2 is a system memory map diagram showing both a processor view and an adapter view of the memory.

FIG. 2 illustrates the system memory map from the point of view of a processor and an adapter. The system memory includes memory address space which is typically distributed among main memory, cache and adapter memory space. As shown in FIG. 2, the processor sees a combination of cache plus main memory space 23 and adapter space 24. The cache plus main memory space 23 is typically composed of a code segment 231, a data segment 232 and, for the practice of this invention, a shared data segment 233. The adapter space is composed of mapped I/O 241. This mapped I/O 241 will include memory assigned to various adapters in the system, but for purposes of this explanation, only one adapter is assumed. From the adapter point of view, the mapped I/O appears as registers 242 and memory 243.

Figure 3:
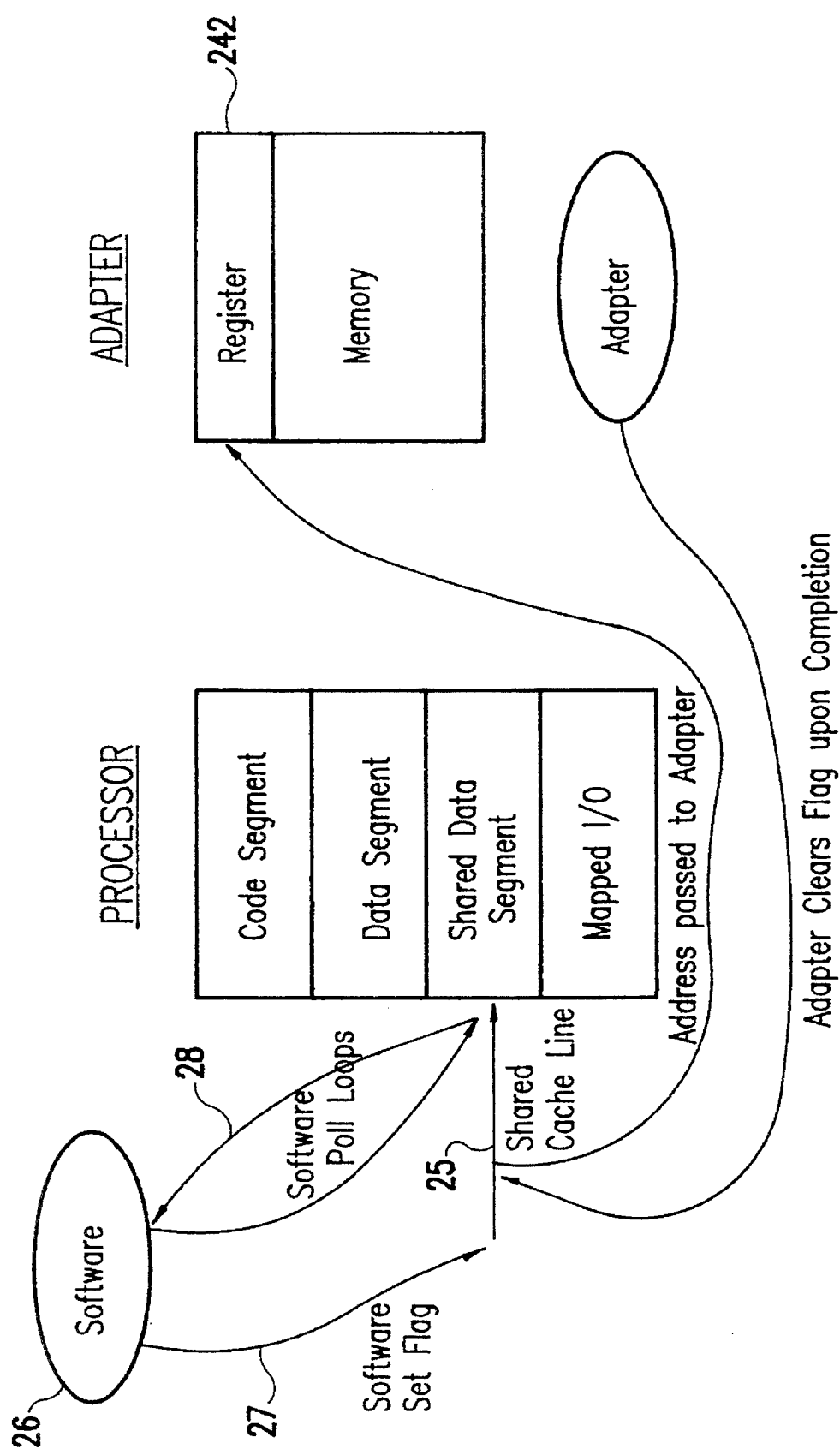
FIG. 3 is a system memory map similar to that shown in FIG. 2 illustrating the polling technique according to the invention.

FIG. 3 illustrates the basic process of the invention. A poll is made within the processor's cache structure, here shown as a shared cache line 25. The cache line 25 is shared by passing its address to a predefined register in the registers 242. The polling status location is mapped in the cachable address space of the processor, which when cached, is typically internal to the processor (i.e., shared cache line 25) complex or attached on a local isolated bus, as shown in FIG. 1. The polling occurs by the software 26 first setting a flag 27 to this normal cachable location. The polling loop 28 continues until the adapter 29 completes its task, at which time it signals to the polling loop by invalidating the shared cache line 25 corresponding to the poll location based on the address stored in the predefined register of registers 242. The next time software 26 tries to read the status value, there is a cache miss due to the invalidation of the cache line. The software terminates the polling loop 28, and the processor automatically reloads the invalidated cache line from memory and gets a new flag value. Upon termination of the polling loop, normal processing continues. The only I/O bus traffic that results is that which is issued by the device to signal cache line invalidation and a subsequent processor initiated cache line reload. Hence, the I/O bus 20 is totally available for all agents while the processor is within the polling loop.

Figures 4A, 4B:
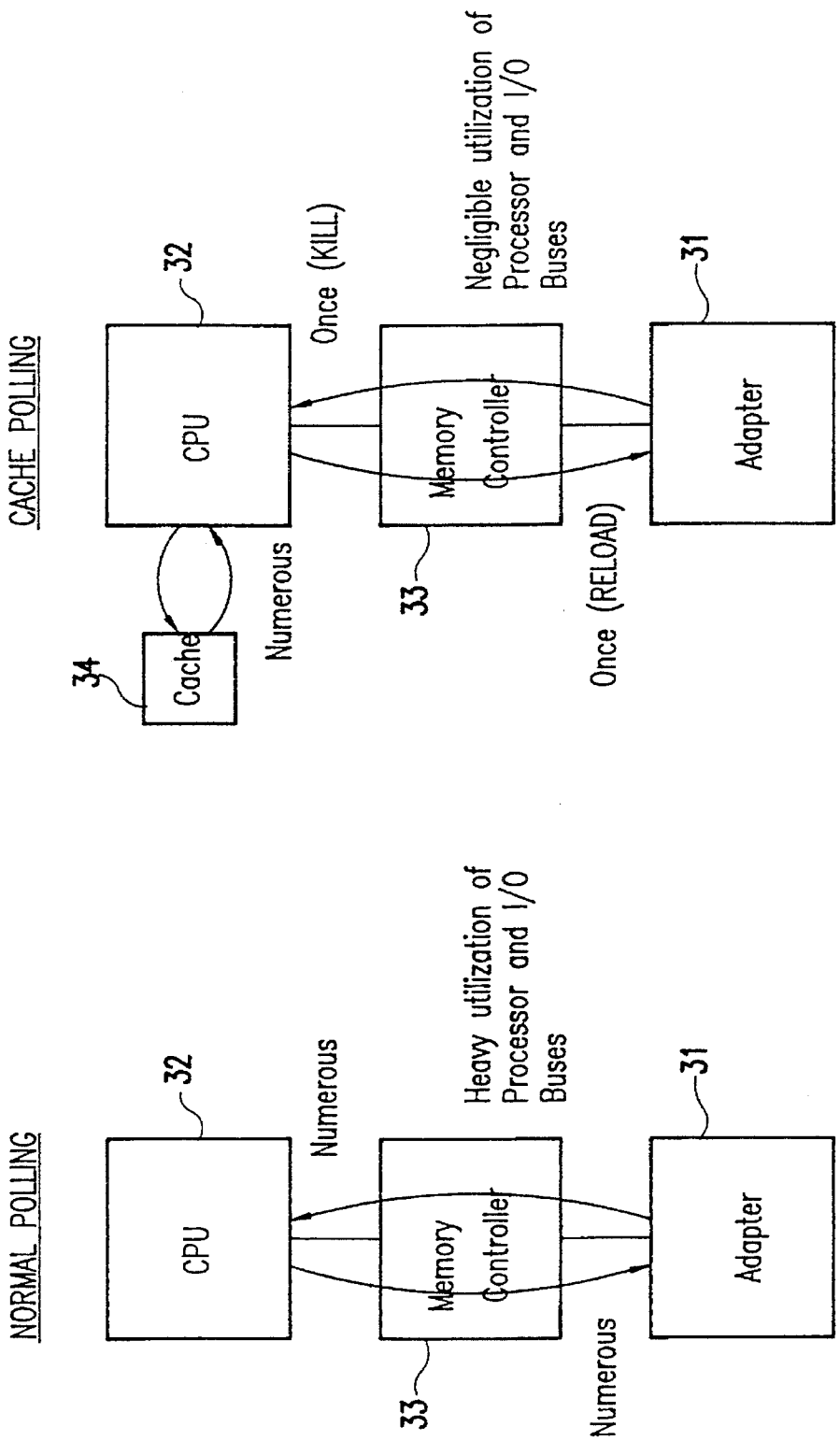
FIGS. 4A and 4B are block diagrams respectively contrasting normal polling and the cache polling according to the invention.

FIGS. 4A and 4B contrast the normal polling technique with the cache polling technique according to the invention. As illustrated in FIG. 4A, the adapter 31 communicates with the CPU 32 via a memory controller 33. During a polling loop, there is heavy traffic on the processor and I/O buses, significantly degrading system performance. In FIG. 4B, using the cache polling technique according to the invention, there is only one communication from the adapter 31 to the CPU 32 via the memory controller 33 and the cache/memory 34 to invalidate the shared cache line and only one communication from the CPU 32 to memory to reload the cache line upon the cache miss signalling the end of the polling loop. This process results in a negligible utilization of the processor and I/O buses, thus having a negligible effect on system performance.

Figure 5:
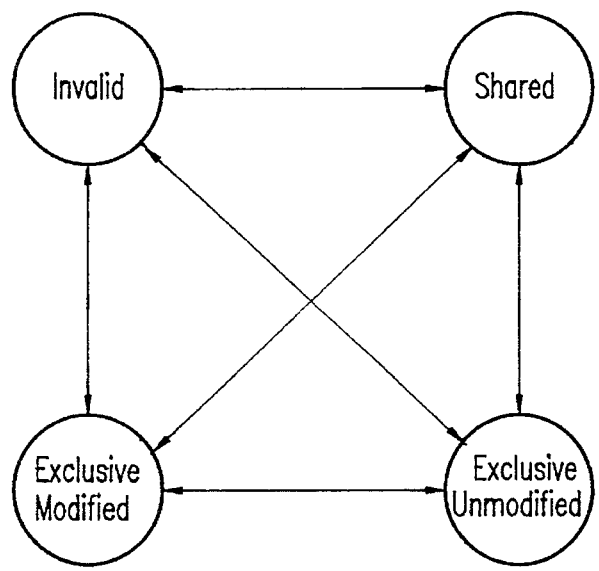
FIG. 5 is a functional block diagram showing a four state cache coherency protocol used in the practice of the invention.

FIG. 5 is a functional block diagram of a four state cache coherency protocol used in the practice of a specific implementation of the invention. The four states are Modified/Exclusive/Shared/Invalid or MESI. This four state cache coherency protocol is implemented in the PowerPC family of processors. The PowerPC microprocessor was jointly developed by Motorola and IBM Corp., and while this specific implementation has been made using the architecture of the PowerPC microprocessor, it will be understood by those skilled in the art that the invention is not limited to this particular processor family. The PowerPC processor bus provides support for the MESI protocol with three encodings that indicate:

Global indicates to the processor that it should snoop the current address transfer.

Shared asserted by the processor to indicate that it has a copy of the data internally, this transaction is asserted in response to the snoop request.

Address retry tells the current bus master to abort the current transfer and rerun at a later time, this transaction is asserted in response to the snoop request.

The processor response to a snoop request is to compare the address on the bus to internal addresses associated with caches. If a match occurs, an appropriate snoop response is issued based on the state (M,E,S,I) of the cache entry.

For a device to invalidate a cache line, a key aspect of this invention utilizes existing cache coherent protocols supported by the PowerPC processor family and system buses. Specifically, in order to maintain cache coherency in a multi-processor (MP) environment, the PowerPC architecture allows snooping devices to invalidate cache lines. The exact bus protocol is referred to as WRITE WITH KILL and KILL BLOCK. In order to invalidate a specific cache line, the snooping device issues the Real Address of the cache line and the processor that owns the cache line responds by internally transitioning its cache state to indicate an INVALIDATE state. If none of the processors own the addressed cache line, then the device does a normal update to memory (in the case of WRITE WITH KILL).

From a software standpoint, a polling location is established within the processor address space. Software marks a flag at this polling location to indicate a Boolean state that is flipped by the device when the poll condition is met. Software implicitly or explicitly informs the device to perform a KILL when the polling condition is met. See FIG. 4B.

As a result of software setting the polling location, the cache transitions to an EXCLUSIVE MODIFIED state. Upon completion of the commands issued by software, the device issues a WRITE WITH KILL bus operation, and updates memory.

Figure 6:
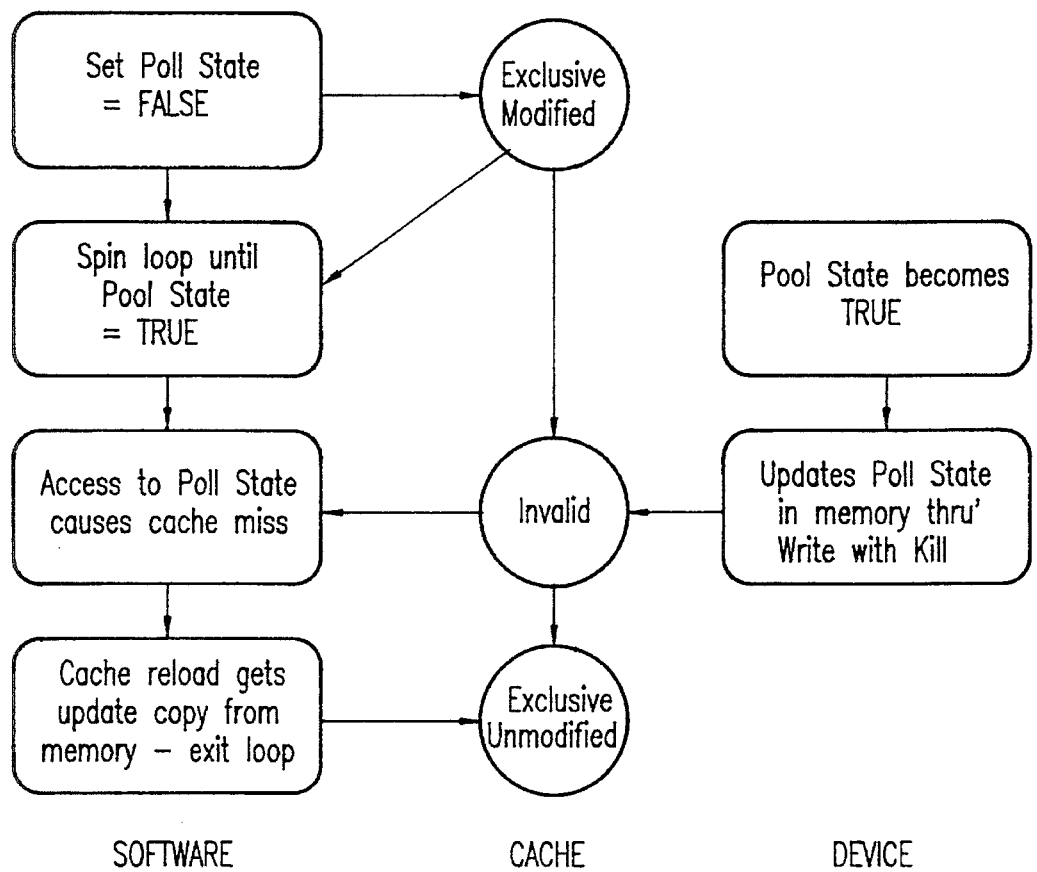
FIG. 6 is a functional flow diagram illustrating the use of the WRITE WITH KILL operation utilized by the polling technique according to the invention.

FIG. 6 illustrates the use of the WRITE WITH KILL operation utilized by polling techniques according to a preferred embodiment of the invention. The WRITE WITH KILL bus operation forces the processor that owns the cache line to transition its cache state to INVALID. The next iteration of the polling loop, forces a cache miss and the processor reloads the modified cache line from memory. This results in the cache transitioning to an EXCLUSIVE UNMODIFIED state. The updated cache state reflects the flipped poll state and the poll loop exits.

The fundamental advantage of this invention is the high availability of system resources (e.g., system buses) to other consumers while a polling operation is in progress. The significance of this advantage is even more relevant for multi-processor (MP) environments. By making the poll location cachable, each process acquires its own unique copy of the state, which can thus be efficiently managed without unnecessary software locks and special synchronization.

The invention is quite general in its applicability. Polling is very commonly used abstraction at various levels of computer software. The CACHE POLLING technique describe in this invention is applicable across a broad set of I/O devices. The additional complications required by devices that support this function is small compared to the potential benefits.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An efficient polling technique in a computer system comprising a processor having a local cache, said processor being connected to a device attached to an input/output bus, said polling technique comprising the steps of:

assigning a shared cache line in the local cache for shared use by the processor and the device;

passing an address of the shared cache line to the device by software running on the processor;

storing by the device the address of the shared cache line in a register space of the device;

setting a flag in the shared cache line in the local cache by the software running on the processor to initiate a polling loop between the processor and the cache upon dispatching a task to be performed by the device, the polling loop between the processor and the cache being independent of the input/output bus;

upon completion of the dispatched task by the device, clearing the flag in the shared cache line by the device; and terminating the polling loop between the processor and the cache by the software upon detecting that the flag in the shared cache line has been cleared.

2. The method recited in claim 1 wherein the step of clearing the flag in the shared cache line by the device is performed by invalidating the shared cache line and wherein detecting that the flag in the shared cache line has been cleared is as a result of a cache miss at the shared cache line due to invalidation of the shared cache line by the device.

3. The method recited in claim 2 further comprising the step of reloading the cache line by the processor in response to the cache miss.

4. A computer system implementing a cache polling technique comprising:

a central processing unit running a software program;

an adapter connected to an input/output bus and communicating with said central processing unit, said adapter being responsive to the software for performing dispatched tasks;

a cache connected to said central processing unit, said software assigning a cache line for shared use by said central processor unit and said adapter and passing an address of the shared cache line to said adapter;

said adapter storing the address of the shared cache line in a register space of the adapter, the software setting a flag in the shared cache line in the local cache to initiate a polling loop between the processor and the cache upon dispatching a task to be performed by said adapter, the polling loop between the processor and the cache being indpendent of the input/output bus, and upon completion of the dispatched task by said adapter, said adapter clearing the flag in the shared cache line and the software terminating the polling loop between the processor and the cache upon detecting that the flag in the shared cache line has been cleared.

5. The computer system recited in claim 4 wherein clearing the flag in the shared cache line by said adapter is performed by invalidating the shared cache line and wherein detecting that the flag in the shared cache line has been cleared is as a result of a cache miss at the shared cache line due to invalidation of the shared cache line by said adapter.

* * * * *